United States Patent
Shen et al.

(10) Patent No.: US 12,504,998 B2
(45) Date of Patent: Dec. 23, 2025

(54) METHODS AND SYSTEMS FOR DYNAMICALLY OPTIMIZING AND MODIFYING ALLOCATION OF VIRTUAL RESOURCES TO PROCESSES

(71) Applicant: Exostellar, Inc., Ithaca, NY (US)

(72) Inventors: Zhiming Shen, Sunnyvale, CA (US); Hakim Weatherspoon, Ithaca, NY (US); Robbert Van Renesse, Ithaca, NY (US)

( * ) Notice: Subject to any disclaimer, the term of this patent is extended or adjusted under 35 U.S.C. 154(b) by 0 days.

(21) Appl. No.: 19/049,229

(22) Filed: Feb. 10, 2025

(65) Prior Publication Data

US 2025/0258720 A1     Aug. 14, 2025

Related U.S. Application Data

(60) Provisional application No. 63/551,964, filed on Feb. 9, 2024.

(51) Int. Cl.
| | | |
|---|---|---|
| G06F 9/455 | (2018.01) | |
| G06F 9/48 | (2006.01) | |
| G06F 9/50 | (2006.01) | |

(52) U.S. Cl.
CPC ........ *G06F 9/5077* (2013.01); *G06F 9/45558* (2013.01); *G06F 9/4881* (2013.01); *G06F 2009/4557* (2013.01)

(58) Field of Classification Search
CPC .................................................. G06F 9/5077
(Continued)

(56) References Cited

U.S. PATENT DOCUMENTS 6,725,221 B2 * 4/2004 Murakami ............. G06F 16/93
                                          707/E17.009
7,512,769 B1 * 3/2009 Lowell .................. G06F 9/461
                                            711/165

(Continued)

FOREIGN PATENT DOCUMENTS

| CN | 115943365 A | 4/2023 |
|---|---|---|
| IL | 300200 | 3/2023 |
| WO | 2022040082 A1 | 2/2022 |

OTHER PUBLICATIONS

Cloud Management Platform Market Size, Overview and scope, Market players, Market Research, Growth During to 2017-2024, Press Release MarketWatch News Department, May 7, 2019. (Accessed Feb. 17, 2020, at https://www.marketwatch.com/press-release/cloud-mana players-market-research-growth-during-to-2017--2024-2020-05-07?mod=mw_quote_news.

(Continued)

*Primary Examiner* — Mehran Kamran
(74) *Attorney, Agent, or Firm* — Blueshift IP LLC; Cynthia M. Gilbert

(57) ABSTRACT

A method for dynamically optimizing and modifying allocation of virtual resources to processes includes allocating, by a first hypervisor, a first amount of a first virtual resource to a process executing in a virtual machine on a first machine. An agent, in communication with a resource allocation process executing in the virtual machine, determines a second amount of the first virtual resource to be utilized by the process. A scheduler receives an identification of the determined second amount and directs migration of the process to a second machine. A second hypervisor executing on the second machine allocates a third amount of the first virtual resource, the third amount substantially similar to the second amount. The method includes communicating, by the resource allocation process, to the pro- (Continued)

cess, that the first amount of the first virtual resource is allocated to the at least one process.

18 Claims, 11 Drawing Sheets

(58) Field of Classification Search
USPC .................................................... 718/1
See application file for complete search history.

(56) References Cited

U.S. PATENT DOCUMENTS

| | | | |
|---|---|---|---|
| 10,091,072 B2 | 10/2018 | Cropper | |
| 11,567,794 B1* | 1/2023 | Emelyanov | G06F 9/4856 |
| 11,886,926 B1* | 1/2024 | Gadalin | G06F 9/4856 |
| 12,099,884 B2* | 9/2024 | An | G06F 9/505 |
| 2007/0180436 A1 | 8/2007 | Travostino | |
| 2015/0220358 A1 | 8/2015 | Ponsford | |
| 2016/0164762 A1 | 6/2016 | Reque | |
| 2016/0217050 A1* | 7/2016 | Grimm | G06F 11/203 |
| 2017/0098071 A1* | 4/2017 | Stopel | G06F 21/554 |
| 2018/0053001 A1* | 2/2018 | Folco | G06F 21/53 |
| 2018/0074748 A1* | 3/2018 | Makin | G06F 9/4856 |
| 2019/0050272 A1* | 2/2019 | Liu | G06F 9/45558 |
| 2019/0250946 A1* | 8/2019 | Parameshwaran | G06F 9/5088 |
| 2019/0278624 A1* | 9/2019 | Bade | G06F 9/4868 |
| 2019/0347127 A1* | 11/2019 | Coady | G06F 8/63 |
| 2020/0034167 A1* | 1/2020 | Parthasarathy | G06F 9/45558 |
| 2020/0065021 A1 | 2/2020 | Mayatskikh | |
| 2020/0097323 A1* | 3/2020 | Nider | G06F 3/067 |
| 2020/0117743 A1* | 4/2020 | Shilimkar | G06F 9/45558 |
| 2020/0192689 A1* | 6/2020 | Smith, IV | G06F 9/45558 |
| 2020/0310853 A1* | 10/2020 | Featonby | G06F 9/45558 |
| 2020/0356397 A1* | 11/2020 | Kumatagi | G06F 9/455 |
| 2021/0026707 A1* | 1/2021 | Rosenberg | G06F 9/45558 |
| 2021/0109775 A1* | 4/2021 | Shen | G06F 9/45558 |
| 2021/0318900 A1* | 10/2021 | Gopalan | G06F 9/45558 |
| 2022/0027778 A1* | 1/2022 | Kochura | G06F 11/3466 |
| 2022/0050705 A1* | 2/2022 | Shen | G06F 9/4868 |
| 2022/0084157 A1* | 3/2022 | Wang | G06T 1/20 |
| 2023/0105439 A1* | 4/2023 | Shen | G06F 8/63 717/177 |
| 2023/0236861 A1* | 7/2023 | Sahu | G06F 9/45558 718/1 |
| 2023/0393879 A1 | 12/2023 | Olmsted-Thompson | |
| 2024/0143378 A1 | 5/2024 | Shen | |
| 2024/0143448 A1* | 5/2024 | Kim | G06F 11/203 |
| 2024/0272942 A1* | 8/2024 | Peng | G06F 9/4856 |
| 2024/0370291 A1* | 11/2024 | Liu | G06F 9/45558 |
| 2025/0021369 A1* | 1/2025 | Parekh | G06F 9/45558 |
| 2025/0307017 A1 | 10/2025 | Zhiming | |

OTHER PUBLICATIONS

Gartner Forecasts Worldwide Public Cloud Revenue to Grow 17.3 Percent in 2019, Press Release, Stamford, Connecticut, USA, Sep. 12, 2018 (Accessed Feb. 17, 2020, at https://www.gartner.com/en/newsroom/press-releases/2018-09-12-gartner-forecasts-worldwide-public-cloud-revenue-to-grow-17-percent-in-2019.).

Christine Parizo "Managing multiple clouds requires careful choice, architecture planning," TechRepublic, Nov. 2016. Accessed Feb. 17, 2020, at https://www.techrepublic.com/article/managing-multiple-clouds-requires-carefulchoice-architectu re-planning/).

Dan Williams et al., "The Xen-Blanket: Virtualize Once, Run Everywhere," EuroSys '12: Proceedings of the 7th ACM European conference on Computer Systems, Bern, Switzerland, Apr. 2012, pp. 113-126.

Daniel Hein, "Cloud Users Are Wasting 35% of Their Cloud Spending," Cloud Computing News 2019. (Accessed Feb. 17, 2020, at https://solutionsreview.com/cloud-platforms/cloud-users-are-wasting-35-of-their-cloud-spending/.).

International Search Report and Written Opinion mailed Dec. 9, 2021, in international patent application No. PCT/US2021/046133, 6 pages.

Jay Chapel, "4 Types of Idle Cloud Resources That Are Wasting Your Money," Technology & Innovation: Cloud Computing, Jun. 26, 2018. (Accessed Feb. 17, 2020, at https://www.business2community.com/cloud-computing/4-types-of-idle-cloud-resources-that-arewasting-your-money-02082628).

Jay Chapel, "Cloud Waste to Hit Over $14 Billion in 2019," DevOps, 2019. (Accessed Feb. 17, 2020, at https://devops.com/cloud-waste-to-hit-over-14-billion-in-2019/).

Larry Dignan, "Top cloud providers in 2020: AWS, Microsoft Azure, and Google Cloud, hybrid, SaaS players," Part of a ZDNet Special Feature: Managing the Multicloud, 2020,48 pages. (Accessed Feb. 17, 2020, at https://www.zdnet com/article/the-top-cloud-providers-of-2020-aws-microsoft-azure-google-cloud-hybrid-saas/).

Laurence Goasduff, "Why Organizations Choose a Multicloud Strategy," Gartner.com, May 2019. at https://www.gartner.com/smarterwithgartner/why-organizations-choose-a-multicloud-strategy/.

Mary Shacklett, "Enterprise leader's guide to building a successful multicloud strategy," Part of a ZDNet Special Feature: Managing the Multicloud, Jul. 1, 2019. (Accessed Feb. 17, 2020, at https://www.zdnet.com/article/ enterprise-leaders-guide-to-building-a-successful-multicloudstrategy/).

Michele Mazzucco et al., "Achieving Performance and Availability Guarantees with Spot Instances," 2011 IEEE International Conference on High Performance Computing and Communications, Banff, AB, Canada, Sep. 2-4, 2011, 8 pages.

Navraj Chohan et al., "See Spot Run: Using Spot Instances for MapReduce Workflows," HotCloud'10: Proceedings of the 2nd USENIX conference on Hot topics in cloud computing, Jun. 2010, 7 pages.

Notice of Allowance issued in App. No. IL300200, dated Oct. 24, 2023, 3 pages.

Office Action (Non-Final Rejection) dated Feb. 4, 2025 for U.S. Appl. No. 18/079,392 (pp. 1-12).

Office Action (Non-Final Rejection) dated Sep. 23, 2024 for U.S. Appl. No. 18/410,938 (pp. 1-9).

Office Action (Notice of Allowance and Fees Due (PTOL-85)) dated Oct. 12, 2023 for U.S. Appl. No. 17/403,326 (pp. 1-8).

Prateek Sharma et al., "SpotCheck: Designing a Derivative IaaS Cloud on the Spot Market," EuroSys '15 (2015) 15 pages.

Qin Jia et al., "Smart Spot Instances for the Supercloud," CrossCloud '16: Proceedings of the 3rd Workshop on CrossCloud Infrastructures & Platforms, London, United Kingdom, Apr. 2016, Article No. 5, pp. 1-6.

Rightscale 2019 State of the Cloud Report from Flexera: As Cloud use grows, organizations focus on Cloud costs and governance, Press Release by Flexera, 2019, 50 pages. Available online at <<https://resources.flexera.com/web/media/documents/rightscale-2019-state-of-the-cloud-report-from-flexera.pdfB.

Ron Miller, VMware acquires Cloud Health Technologies for multi-cloud management, TechCrunch, Aug. 27, 2018. (Accessed Feb. 26, 2020, at https://techcrunch.com/2018/08/27/vmware-acquires-cloudhealth-technologies-for-Multi-cloud-management).

Sangho Yi et al., "Reducing Costs of Spot Instances via Checkpointing in the Amazon Elastic Compute Cloud," 2010 IEEE 3rd International Conference on Cloud Computing, Miami, FL, Jul. 5-10, 2010, pp. 236-243.

Supreeth Shastri et al., "Cloud Index Tracking: Enabling Predictable Costs in Cloud Spot Markets," SoCC '18: Proceedings of the ACM Symposium on Cloud Computing, Carlsbad, CA, USA, Oct. 11-13, 2018, pp. 451-463. Available online at: <<https://doi.org/10.1145/3267809.3267821>>.

Supreeth Shastri et al., "HotSpot: Automated Server Hopping in Cloud Spot Markets," SoCC '17: Proceedings of the 2017 Symposium on Cloud Computing, Santa Clara, California, US, Sep. 2017, pp. 493-505.

(56) References Cited

OTHER PUBLICATIONS

Supreeth Subramanya et al., "SpotOn: A Batch Computing Service for the Spot Market," SoCC '15: Proceedings of the Sixth ACM Symposium on Cloud Computing, Kohala Coast, Hawaii, USA, Aug. 2015 pp. 329-341.

Taifi, "Banking on Decoupling: Budget-driven Sustainability for HPC Applications on Auction-based Clouds," ACM SIGOPS Operating Systems Review, vol. 47, No. 2, 2012, pp. 41-50.

Timothy Wood et al, "Black-box and Gray-box Strategies for Virtual Machine Migration," NSDI '07,4th Usenix Symposium on Networked Systems Design & Implementation, Apr. 11-13, 2007, Cambridge, Massachusetts, USA, 14 )ages.

Zhiming Shen et al., "Follow the Sun through the Clouds: Application Migration for Geographically Shifting Workloads," 3oCC '16: Proceedings of the Seventh ACM Symposium on Cloud Computing, Oct. 2016, pp. 141-154.

Zhiming Shen et al., "X-Containers: Breaking Down Barriers to Improve Performance and Isolation of Cloud-Native Containers," ASPLOS '19: Proceedings of the Twenty-Fourth International Conference on Architectural Support for Programming Languages and Operating Systems, Providence, Rhode Island, USA, Apr. 13-17, 2019, pp. 121-135.

Office Action (Final Rejection) dated Apr. 14, 2025 for U.S. Appl. No. 18/410,938 (pp. 1-6).

International Search Report and Written Opinion issued in App. No. PCT/US2025/15209, dated May 23, 2025, 10 pages.

Extended European Search Report issued in App. No. EP21858893, dated Sep. 25, 2024, 13 pages.

Andreas Fischer et al: "Wide-Area Virtual Machine Migration as Resilience Mechanism", Reliable Distributed Systems Workshops (SRDSW), 2011 30TH IEEE Symposium On, IEEE, Oct. 4, 2011 (Oct. 4, 2011), pp. 72-77, XP032022027, DOI: 10.1109/SRDSW.2011.16 ISBN: 978-1-4577-1624-9.

Tay, Y. C. et al: "A Performance Comparison of Containers and Virtual Machines in Workload Migration Context", 2017 IEEE 37th International Conference On Distributed Computing Systems Workshops (ICDCSW), IEEE, Jun. 5, 2017 (Jun. 5, 2017), pp. 61-66, XP033122904, DOI: 10.1109/ICDCSW.2017.44 [retrieved on Jul. 13, 2017].

Office Action (Notice of Allowance and Fees Due (PTOL-85)) dated Aug. 5, 2025 for U.S. Appl. No. 18/410,938 (pp. 1-5).

Office Action (Notice of Allowance and Fees Due (PTOL-85)) dated Aug. 26, 2025 for U.S. Appl. No. 18/410,938 (pp. 1-2).

Office Action (Notice of Allowance and Fees Due (PTOL-85)) dated Aug. 28, 2025 for U.S. Appl. No. 18/079,392 (pp. 1-9).

* cited by examiner

METHODS AND SYSTEMS FOR DYNAMICALLY OPTIMIZING AND MODIFYING ALLOCATION OF VIRTUAL RESOURCES TO PROCESSES

CROSS-REFERENCE TO RELATED APPLICATIONS

This application claims priority to U.S. Provisional Patent Application 63/551,964, filed on Feb. 9, 2024, entitled, "Methods and Systems For Dynamically Optimizing and Modifying Allocation of Virtual Resources to Processes," which is hereby incorporated by reference.

BACKGROUND

The disclosure relates to methods for dynamically optimizing and modifying resource allocations. More particularly, the methods and systems described herein relate to functionality for dynamically optimizing and modifying allocation of virtual resources to processes.

Conventionally, due to the many dependencies of an executing process to an underlying operating system, it is difficult, if not impossible, to migrate a process while the process executes. As a result, when a system allocates a virtual resource to a process such as a containerized process or a process executing in a virtual machine, conventional systems typically over-allocate virtualized resources to minimize the likelihood of a process needing more resources than are available. Additionally, such conventional systems typically do not modify an amount of a virtual resource allocated to a process during execution of the process, even after the process has begun executing and demonstrates utilization of less than all of the allocated virtual resource. Such over-allocations and failures to adapt to resource utilization during process execution result in inefficient use of resources and artificial, possibly unnecessary, constraints. Therefore, there is a need for technological solutions that can modify resource allocations during process execution and, if need be, migrate the executing process to a system that can allocate needed resources if utilization rates change during execution.

BRIEF SUMMARY

In one aspect, a method for dynamically optimizing and modifying allocation of virtual resources to containerized processes includes allocating, by a first hypervisor executing on a first machine, a first amount of a first virtual resource to a container image executing on the first machine and including a containerized process, the first virtual resource associated with at least one physical resource of the first machine. The method includes determining, by an agent in communication with a resource allocation process executing in an instance of the container image, a second amount of the first virtual resource to be utilized by the containerized process. The method includes transmitting, by the agent to a scheduler, an identifier of the determined second amount. The method includes determining, by the scheduler, that the determined second amount is different than the allocated first amount. The method includes directing, by the scheduler, migration of the containerized process, during execution of the containerized process, to a second machine based upon the determined second amount. The method includes allocating, by a second hypervisor executing on the second machine, a third amount of the first virtual resource, the third amount substantially similar to the determined second amount. The method includes communicating, by the resource allocation process, to the containerized process, that the first amount of the first virtual resource is allocated to the containerized process.

In another aspect, a method for dynamically optimizing and modifying allocation of virtual resources to a process executing in a virtual machine includes allocating, by a first hypervisor executing on a first machine, a first amount of a first virtual resource to a process executing in a virtual machine, the first virtual resource associated with at least one physical resource of the first machine. The method includes determining, by an agent in communication with a resource allocation process executing in the virtual machine, a second amount of the first virtual resource to be utilized by the process. The method includes transmitting, by the agent to a scheduler, an identifier of the determined second amount. The method includes determining, by the scheduler, that the determined second amount is different than the allocated first amount. The method includes directing, by the scheduler, migration of the process to a second machine based upon the determined second amount. The method includes allocating, by a second hypervisor executing on the second machine, a third amount of the first virtual resource, the third amount substantially similar to the second amount. The method includes communicating, by the resource allocation process, to the process, that the first amount of the first virtual resource is allocated to the process.

In still another aspect, a system for dynamically optimizing and modifying allocation of virtual resources to containerized processes includes a first hypervisor executing on a first machine allocating a first amount of a first virtual resource to a container image executing on the first machine and including a containerized process, the first virtual resource associated with at least one physical resource of the first machine. The system includes an agent determining a second amount of the first virtual resource to be utilized by containerized process. The system includes a scheduler receiving, from the agent, an identifier of the determined second amount, determining that the determined second amount is different than the allocated first amount, directing migration of the containerized process, during execution of the containerized process, to a second machine based upon the determined second amount. The system includes a second hypervisor executing on the second machine allocating a third amount of the first virtual resource, the third amount substantially similar to the determined second amount. The system includes a resource allocation process, executing in an instance of the container image and in communication with the agent, communicating, to the containerized process on the second machine, that the first amount of the first virtual resource is allocated to the containerized process.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The methods and systems described herein may provide functionality for dynamically optimizing and modifying allocation of virtual resources to processes executing in virtual machines.

Figure 1A:
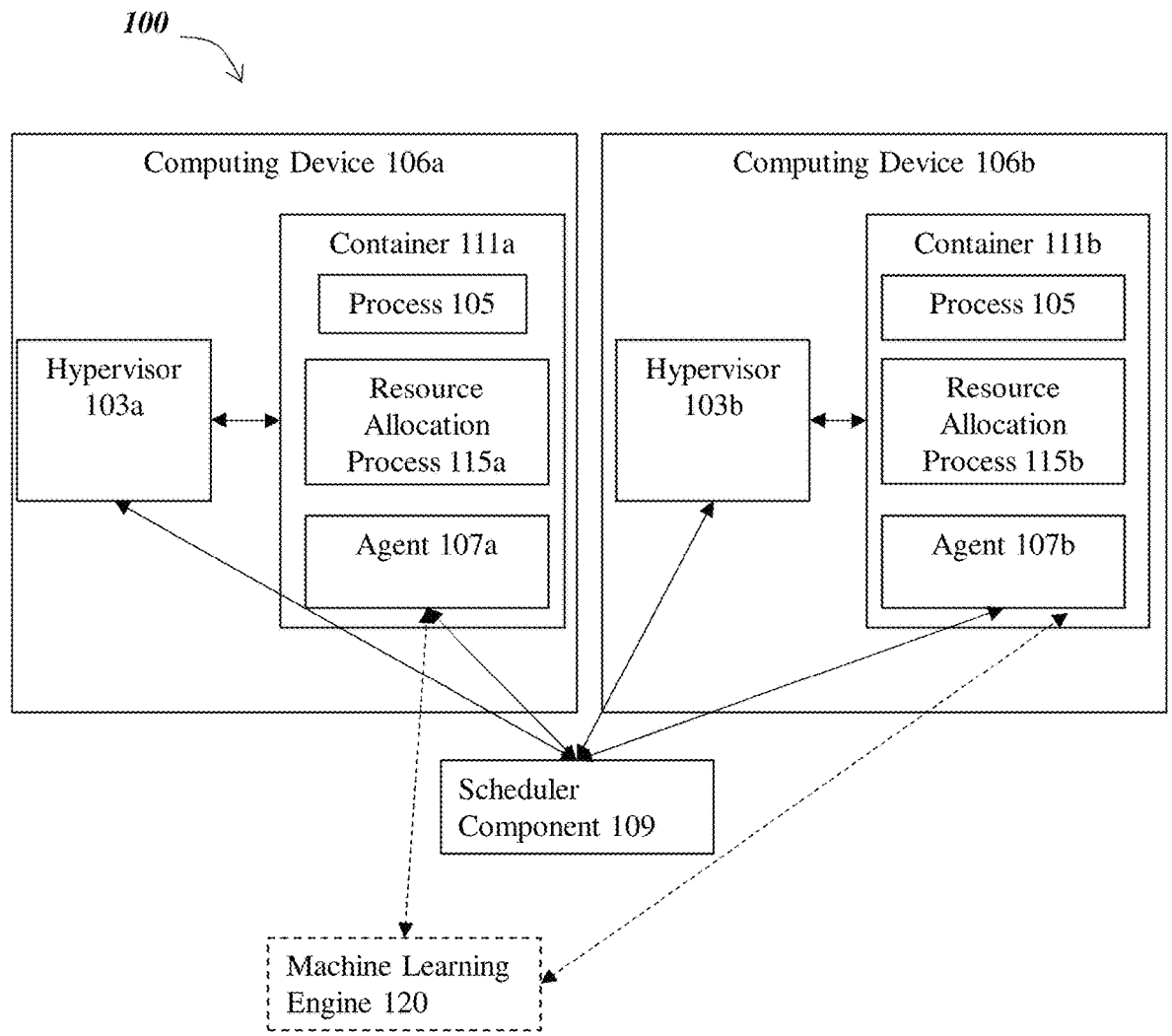
FIG. 1A is a block diagram depicting an embodiment of a system for dynamically optimizing and modifying allocation of virtual resources to containerized processes.

Referring now to FIG. 1A, a block diagram depicts one embodiment of a system for dynamically optimizing and modifying allocation of virtual resources to processes executing in virtual machines. In brief overview, the system 100 includes a first computing device 106a and a second computing device 106b, a scheduler component 109, hypervisors 103a-b, containers 111a-b, a process 105, agents 107a-b, and resource allocation processes 115a-b. The system 100 may optionally execute a machine learning engine 120. The computing devices 106a-b may be a modified type or form of computing device (as described in greater detail below in connection with FIGS. 3A-3C) that have been modified to execute instructions for providing the functionality described herein; these modifications result in a new type of computing device that provides a technical solution to problems rooted in computer technology, such as modification of resources allocated to, and migration of, executing processes.

The computing devices 106a and 106b may include functionality for instantiating a container image as a containerized process. As will be understood by those of skill in the art, conventional containers (and their associated container images) share a host computing device's kernel to run an application (or other process) within the container; the conventional container typically includes only binaries, libraries, and runtime components—the isolation may be considered to be process-level isolation. The methods and systems described herein may provide functionality for instantiating and migrating executing containerized processes that execute in this way. The methods and systems described herein may provide functionality for instantiating and migrating executing containerized processes that include (or require) dedicated operating system kernels as well. The methods and systems described herein may provide functionality for supporting an operating system kernel that can be directly mapped into an address space of the containerized process. The methods and systems described herein may provide functionality for supporting an operating system kernel that can run separately in its own address space for isolation.

The system 100 may optionally include a container engine (not shown) that may provide functionality for receiving instructions to instantiate container images and directing the instantiation of the container image, resulting in a container 111. The container image may be a container image that includes a dedicated kernel. The container image may be a container image that includes a dedicated kernel executing as a library in user mode. The container image may be a container image that does not include a dedicated kernel.

The hypervisors 103a-b may be provided as software components. The hypervisors 103a-b may be provided as hardware components. The computing device 106a-b may execute the hypervisors 103a-b.

The computing device 106a may execute an instance of the container image, which may also be referred to herein as executing the container 111a. The container 111a, in turn, executes the process 105. Similarly, the computing device 106b may execute the container 111b, which may execute the process 105 after migration of the process 105 from the computing device 106a to the computing device 106b.

The agents 107a-b (which may be referred to generally as agents 107) may be provided as software components. The agents 107a-b may be provided as hardware components. The agents 107a-b may be or execute a resource scheduler component (not shown) to determine an amount of a virtual resource to be utilized by the process 105. The agents 107a-b may include the functionality of or be in communication with one or more optional machine learning engines 120.

Figure 1B:
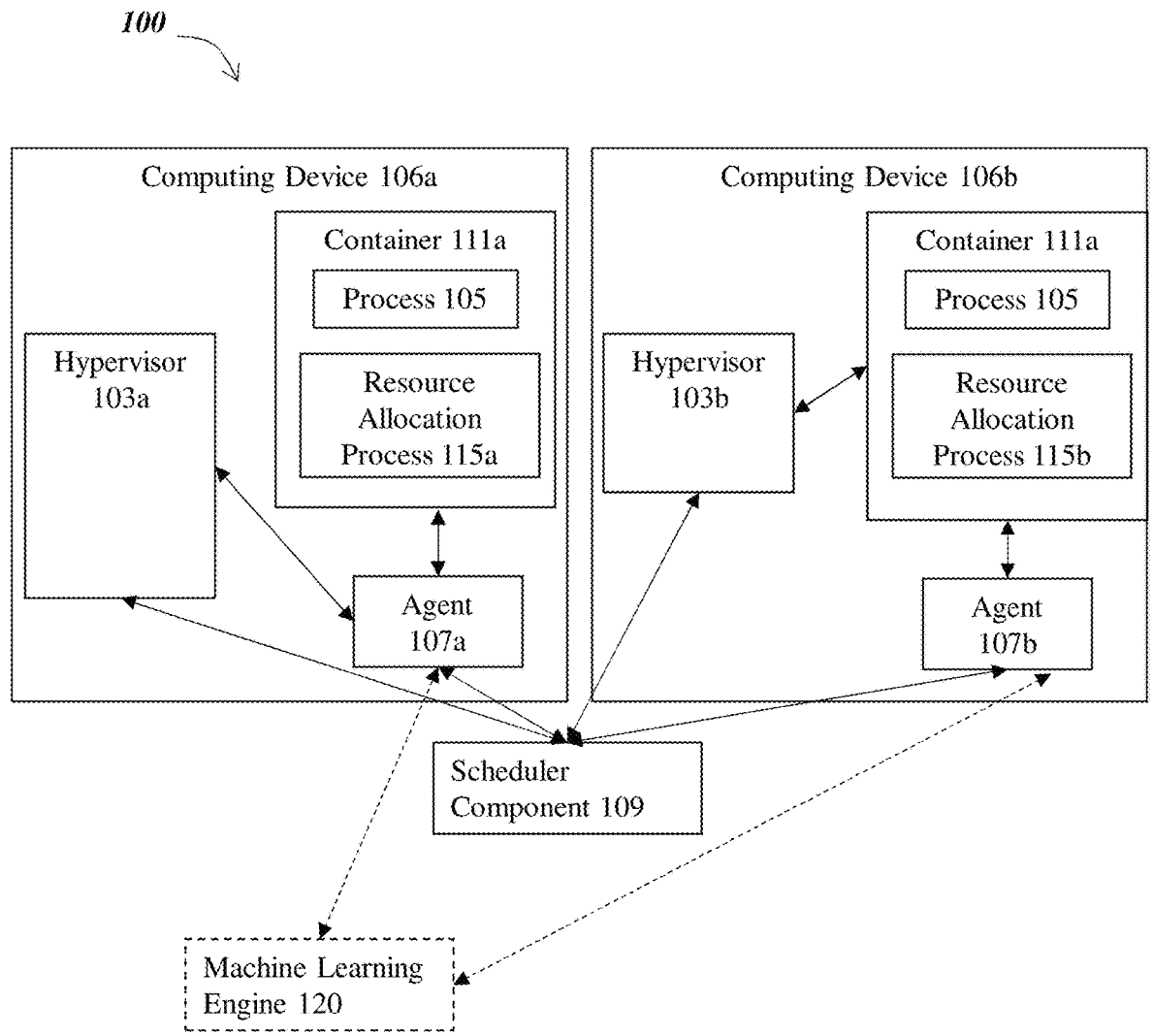
FIG. 1B is a block diagram depicting an embodiment of a system for dynamically optimizing and modifying allocation of virtual resources to containerized processes.
Figure 1C:
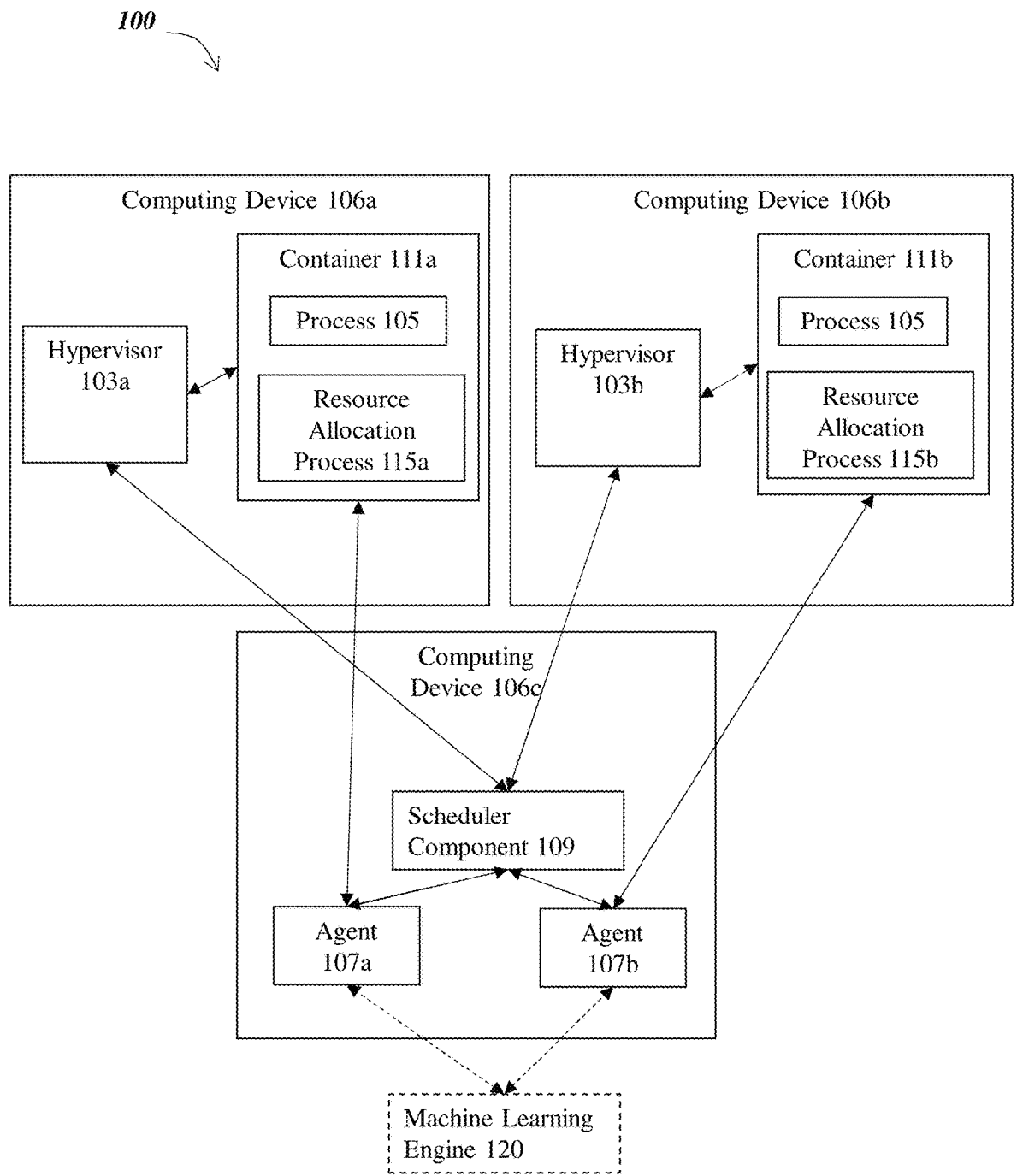
FIG. 1C is a block diagram depicting an embodiment of a system for dynamically optimizing and modifying allocation of virtual resources to containerized processes.

As shown in FIG. 1A, the agents 107a-b may execute in the container 111a. The agents 107a-b may execute in a user space of the containers 111a-b. The agents 107a-b may alternatively execute in a kernel space of the containers 111a-b. As shown in FIG. 1B, the agents 107a-b may execute on a computing device 106a and/or computing device 106b on which the hypervisors 103a-b execute but outside of the container 111a-b. As shown in FIG. 1C, the agents 107a-b may execute on a computing device 106c on which the scheduler component 109 executes.

Referring back to FIG. 1A, the container 111a may execute the agent 107a. The container 111b may execute the agent 107b.

The agents 107a-b may be in communication with the resource allocation processes 115a-b. The resource allocation processes 115a-b may be provided as software executing within the containers 111a-b. The resource allocation processes 115a-b may be drivers executed by kernels. The resource allocation processes 115a-b may be kernels. The resource allocation processes 115a-b may be kernels executing within the containers 111a-b (or virtual machines 113a-b as depicted in FIGS. 1D-F).

The system 100 may include a scheduler component 109. The scheduler component 109 may execute on a third computing device 106c. The scheduler component 109 may be in communication with the computing devices 106a-b. The scheduler component 109 may be in communication with the hypervisors 103a-b. The scheduler component 109 may be in communication with the agents 107a-b. The scheduler component 109 may include functionality for communicating with an optional container engine. The scheduler component 109 may provide functionality for managing migrations. The scheduler component 109 may monitor a status of the system 100. The scheduler component 109 may trigger process migrations based on one or more policies. Policies may include, by way of example, policies for optimizing cost, minimizing latency, or increasing availability. The scheduler component 109 may trigger process migrations based on data received from the agents 107a-b regarding a level of resource utilization consumed by one or more processes 105.

The container 111a may execute the process 105. The container 111b may execute the execute the process 105 after migration of the process 105 from the computing device 106a to the computing device 106b. The process 105 may be any type or form of executable computer program. The process 105 may be referred to as a containerized process 105 when the process 105 executes within a container.

Figure 1D:
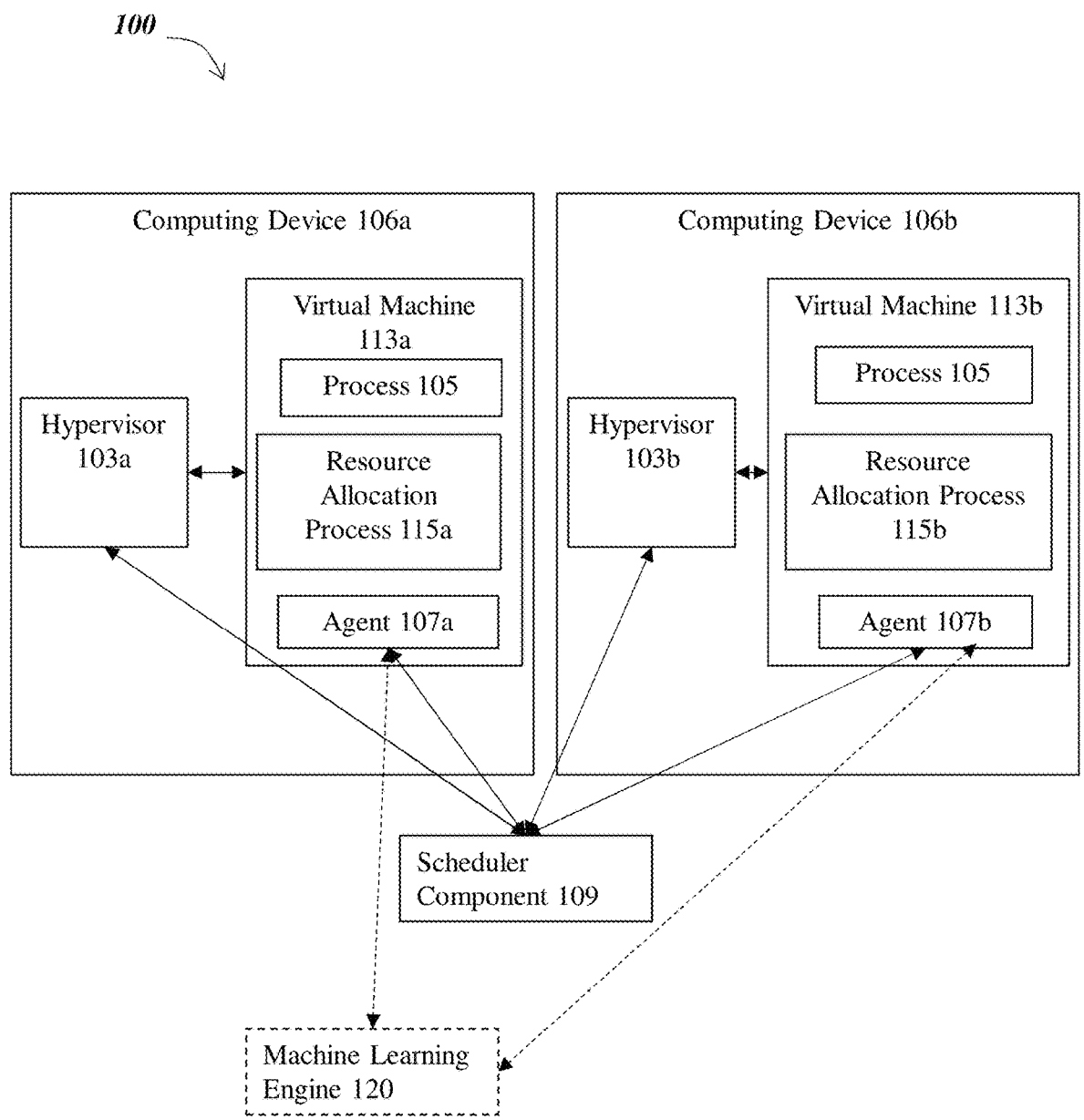
FIG. 1D is a block diagram depicting an embodiment of a system for dynamically optimizing and modifying allocation of virtual resources to processes executing in virtual machines.
Figure 1E:
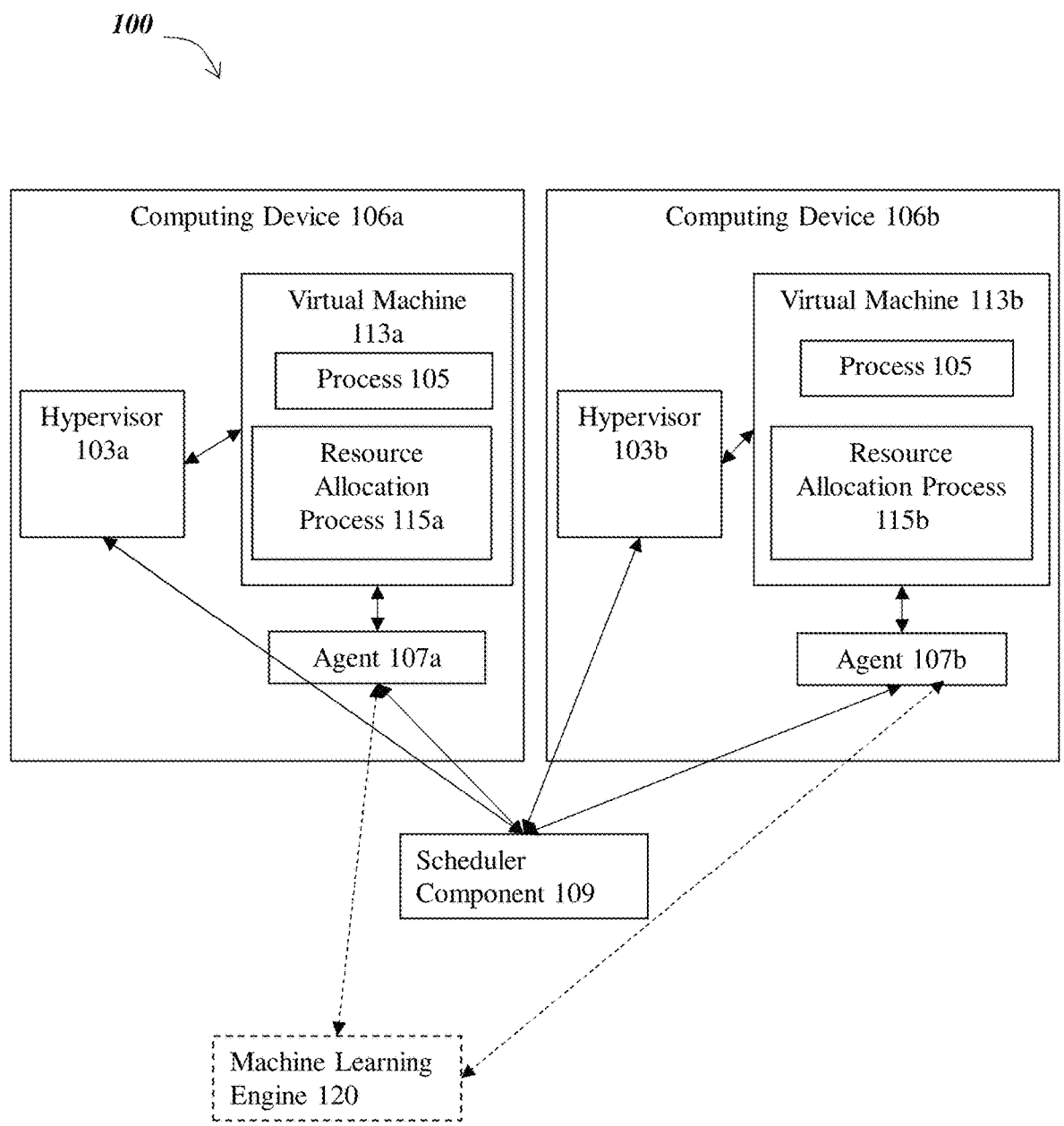
FIG. 1E is a block diagram depicting an embodiment of a system for dynamically optimizing and modifying allocation of virtual resources to processes executing in virtual machines.
Figure 1F:
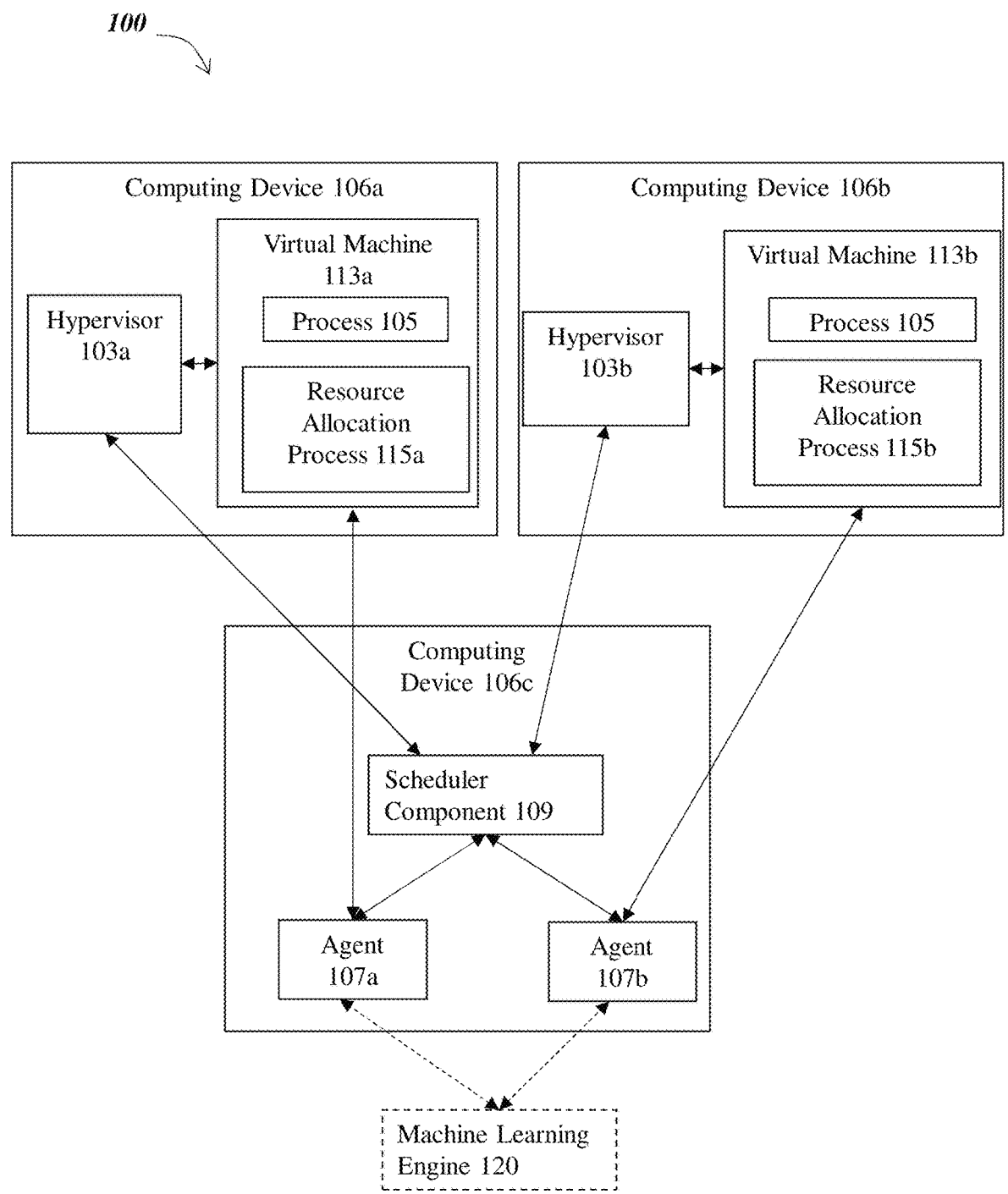
FIG. 1F is a block diagram depicting an embodiment of a system for dynamically optimizing and modifying allocation of virtual resources to processes executing in virtual machines.

Referring now to FIG. 1D, in some embodiments the system 100 executes one or more virtual machines 113a-b instead of or in addition to containers 111a-b. In such embodiments, the process 105 is an application executed within a virtual machine 113a-b instead of a containerized process. In such embodiments, and as shown in FIG. 1D, the agents 107a-b may execute in the virtual machines 113a-b. As shown in FIG. 1E, the agents 107a-b may execute on a computing device 106a and/or computing device 106b on which the hypervisors 103a-b execute but outside of the virtual machines 113a-b. As shown in FIG. 1F, the agents 107a-b may execute on a computing device 106c on which the scheduler component 109 executes.

Although, for ease of discussion, components are described in FIGS. 1A-1F as separate modules, it should be understood that this does not restrict the architecture to a particular implementation. For instance, these components may be encompassed by a single circuit or software function or, alternatively, distributed across a plurality of computing devices.

Figure 2A:
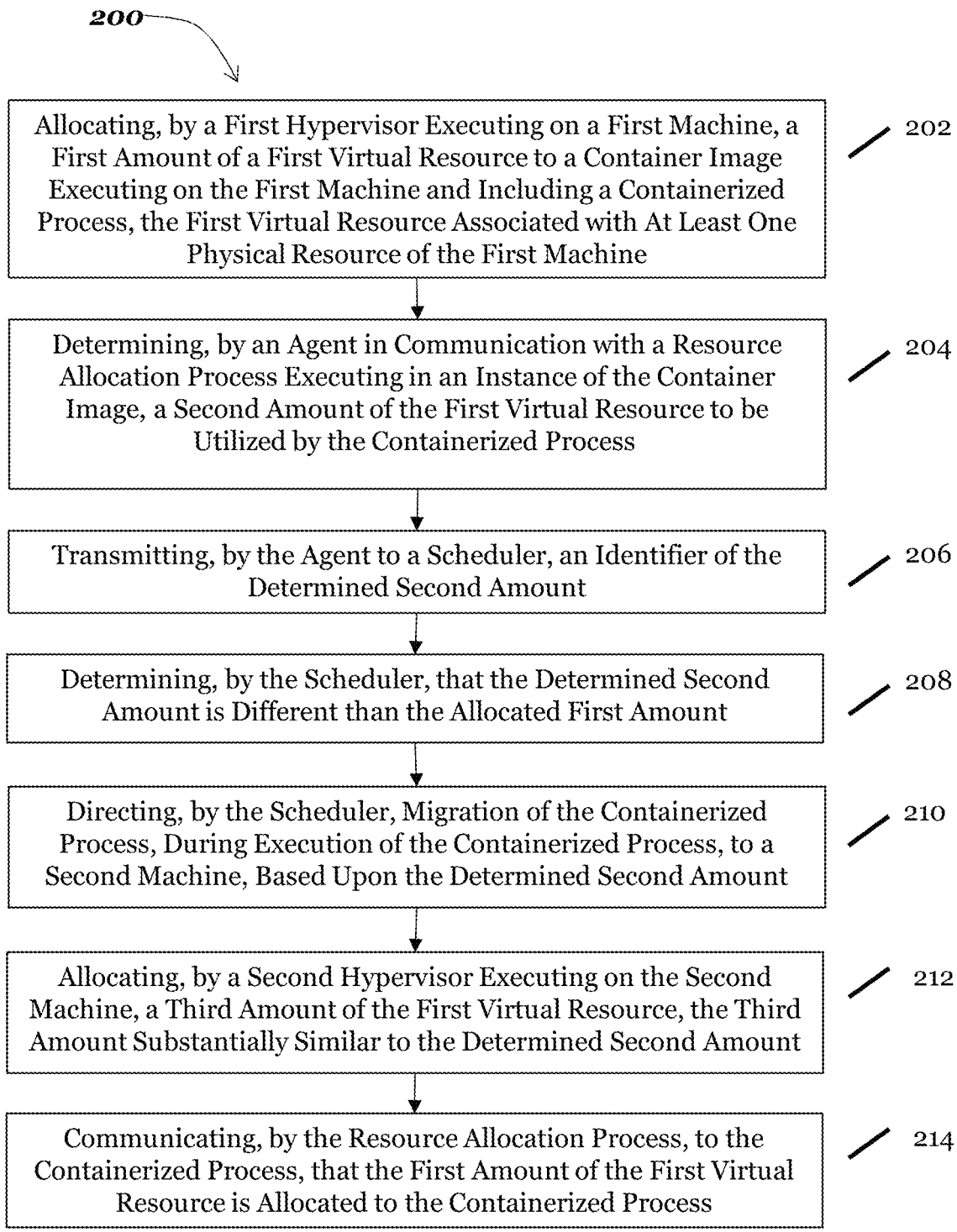
FIG. 2A is a flow diagram depicting an embodiment of a method for dynamically optimizing and modifying allocation of virtual resources to containerized processes.

Referring now to FIG. 2A, in brief overview, a block diagram depicts one embodiment of a method 200 for dynamically optimizing and modifying allocation of virtual resources to containerized processes. The method 200 includes allocating, by a first hypervisor executing on a first machine, a first amount of a first virtual resource to a container image executing on the first machine and including a containerized process, the first virtual resource associated with at least one physical resource of the first machine (202). The method 200 includes determining, by an agent in communication with a resource allocation process executing in an instance of the container image, a second amount of the first virtual resource to be utilized by the containerized process (204). The method 200 includes transmitting, by the agent to a scheduler, an identifier of the determined second amount (206). The method 200 includes determining, by the scheduler, that the determined second amount is different than the allocated first amount. (208). The method 200 includes directing, by the scheduler, migration of the containerized process, during execution of the containerized process, to a second machine, based upon the determined second amount (210). The method 200 includes allocating, by a second hypervisor executing on the second machine, a third amount of the first virtual resource, the third amount substantially similar to the determined second amount (212). The method 200 includes communicating, by the resource allocation process, to the containerized process, that the first amount of the first virtual resource is allocated to the containerized process (214).

Referring now to FIG. 2A, in greater detail and in connection with FIG. 1, the method 200 includes allocating, by a first hypervisor executing on a first machine, a first amount of a first virtual resource to a container image executing on the first machine and including a containerized process, the first virtual resource associated with at least one physical resource of the first machine (202). When the container image is instantiated, the first hypervisor may allocate a pre-determined amount of the first virtual resource (such as an amount of memory, an amount of processing power, an amount of access to a resource such as a disk or network, etc.) to the containerized process.

The method 200 includes determining, by an agent in communication with a resource allocation process executing in an instance of the container image, a second amount of the first virtual resource to be utilized by the containerized process (204). The agent 107a may access a file that logs utilization data (e.g., of memory or CPU or other resources) to determine the second amount. The agent 107a may access data identifying an amount allocated by the hypervisor 103a to the process 105 (and/or to the container 111a) determine the second amount. The agent 107a may use accessed data to determine an amount of utilization of a virtual resource by the process 105 compared to an amount of allocation of the virtual resource. The agent 107a may communicate that determined amount to the scheduler component 109, which may determine to modify the amount of the virtual resource allocated to the process 105—without indicating to the process 105 that the modification has occurred.

The agent 107a may compare a first level of utilization of the first virtual resource by the process with a second level of utilization of the first virtual resource by a different process—for example, by the process 105 at a different time or by a different process having a similar or same type as the process 105. For example, the agent 107a may determine, without limitation, that the process 105 is executing during a session by a user of the computing device 106a and identify a previously logged time during which the process 105 executed during a previous session by the user and may compare the current level of utilization of the first resource with the level of utilization during the previous session. As another example, the agent 107a may determine, without limitation, that the process 105 is a type of application—such as a word processing application or a computer aided design application or a communications application or any other type of application—and may access and review utilization logs of other processes having substantially the same type and then compare the current level of utilization with a level of utilization logged during execution of the other process of the same or substantially the same type. As a further example, the agent 107a may include or be in communication with a machine learning engine (not shown), which may take as input metadata associated with the process 105 (including, for example, and without limitation, process name, process type, user data, computing device 106a data, etc.) and generate a prediction of a level of utilization that the process 105 will require during the current execution of the process 105. In some embodiments, the agent 107a may receive user input from a user of the process 105 (whether it is executing on the computing device 106a or on the computing device 106b or on another computing device), the user input providing additional information for use in determining the level of utilization of the first virtual resource during the current execution of the process 105 (e.g., via user input and/or ad hoc requests). The agent 107a may receive user input from a user of the process 105 (whether it is executing on the computing device 106a or on the computing device 106b or on another computing device), the user input providing additional information for use in determining a second amount of the first virtual resource to be utilized by the containerized process. The agent 107a may receive from the process 105 (whether it is executing on the computing device 106a or on the computing device 106b or on another computing device), data for use in determining the second amount of the first virtual resource to be utilized by the containerized process. As the containerized process 105 executes, the agent 107a may monitor the containerized process' utilization of the first virtual resource.

The agent 107a may be in communication with a resource allocation process 115a executing in the instance of the container image. The resource allocation process may transmit resource utilization requests to the hypervisor 103a. The resource allocation process 115a may include functionality for modifying an allocation of a virtual resource made by the hypervisor for the process 105. However, unlike conventional processes such as balloon drivers, the resource allocation process 115a may be configured to enable more than one modification to an allocation. Furthermore, and unlike conventional processes such as balloon drivers, the resource allocation process 115a may be configured to enable delayed allocation of virtual resources. For example, the hypervisor 103a may inform the virtual machine 113a and/or the process 105 that the hypervisor 103a has allocated a certain amount of a virtual resource; the resource allocation process 115a however may direct the hypervisor 103a to allocate less than that amount of the virtual resource without the process 105 receiving an indication of how much of the virtual resource is actually allocated—when the process 105 utilizes the amount actually allocated the resource allocation process 115a may then direct the hypervisor 103a to allocate an additional amount of the virtual resource up to the total amount initially allocated by the hypervisor 103a.

The method 200 includes transmitting, by the agent to a scheduler, an identifier of the determined second amount (206). The agent 107a may transmit the identifier to the scheduler component 109.

The method 200 includes determining, by the scheduler, that the determined second amount is different than the allocated first amount (208). For example, the scheduler component 109 may determine that the process 105 is utilizing less than all of the virtual resource allocation made available by the hypervisor 103a. The scheduler component 109 may determine, based upon information received from the agent 107a, that the process 105 is not going to use more of the virtual resource allocation during execution of the process 105; for example, the agent 107a may provide a prediction of how much of the allocated resource the process 105 is likely to use during execution. The scheduler component 109 may then determine to migrate the process 105 from the container 111a to a container 111b (whether on the second computing device 106b as shown in FIG. 1A or a different container on the computing device 106a or on a third computing device not shown). This determination may be described as determining to "right size" the process 105—that is, if the agent 107a determines that the process 105 is utilizing less than allocated and/or that the agent 107a determines that the process 105 has a likelihood less than a threshold level of likelihood of utilizing the entire allocation, then the scheduler component 109 may determine to migrate the process 105 to a container 111b that will allocate the amount of the virtual resources that the process 105 will utilize and not substantially more than that amount.

Similarly, if a process 105 is executing in a container 111a that has insufficient resources available for the process 105, the scheduler component 109 may migrate the process 105 to a container 111b that can meet the resource allocation needs of the process 105 before there is a failure to meet those needs and, as a result, the process 105 fails to execute. By executing the methods and systems described herein, the system 100 may dynamically change an amount of a resource allocated to a process 105 in order to ensure that resources are available for allocation to processes that will utilize those resources instead of being allocated to processes that do not need those resources—and that the allocations can be modified so that if a process 105 requires additional resources, the system 100 can migrate the process 105 to a computing device 106 or to a container 111 that can satisfy the resource utilization needs of the process 105. Therefore, in some embodiments, execution of the methods and systems described herein result in improved process execution and improved resource allocation over conventional technologies.

The method 200 includes directing, by the scheduler, migration of the containerized process, during execution of the containerized process, to a second machine, based upon the determined second amount (210). Unlike conventional techniques such as checkpointing and then restoring, the scheduler need not terminate the process before migrating—the migration may be a live migration that transitions the process to the second machine without interruption or data loss.

In an embodiment in which the determined second amount indicates that the process 105 needs more resources than were allocated, the scheduler component 109 may trigger a slowdown of execution while migrating the process 105 to a container 111b that can satisfy the utilization needs of the process 105. By triggering a migration to a container that provides the process 105 with a resource allocation that satisfies the needs of the process 105, the "right sizing" determination and migration may in more efficient resource utilization without increasing the likelihood of process failures. As will be understood by those of skill in the art, each process includes one or more executing threads. In some embodiments, the methods 200 and 250 may include directing, by the scheduler, a pause in execution of a first subset of threads in a plurality of threads of the process; directing, by the scheduler, during continued execution of a second subset of threads in the plurality of threads of the process, migration of the process to the second machine; and directing, by the scheduler, continued execution of the first subset and the second subset of threads in the plurality of threads of the process upon completion of the migration of the process to the second machine. Similarly, the agent in communication with the resource allocation process, may monitor utilization of the first virtual resource by the containerized process; identify a modification to a utilization rate by the containerized process of the first virtual resource; and communicate, to the scheduler, the identified modification. The scheduler may direct a pause in execution of a first subset of threads in a plurality of threads of the containerized process; may direct, during continued execution of a second subset of threads in the plurality of threads of the containerized process, migration of the containerized process to a third machine; and may direct continued execution of the first subset and the second subset of threads in the plurality of threads of the containerized process upon completion of the migration of the containerized process to the third machine.

The first subset of threads may include threads that need (or are predicted to need) an allocation of more of the first virtual resource than is currently available. The second subset of threads may include threads that may continue executing because the threads in the second subset are not waiting for resources and are not predicted to do so before the migration completes. Therefore, execution of the methods and systems described herein solve the technical problem of increased likelihood of out-of-memory errors and other errors that occur due to resource utilization spikes when insufficient resources have been allocated while still allowing for the allocation of fewer resources to each process (and therefore enabling execution of more processes on each machine) than conventional systems would need to allocate in order to avoid such errors.

The scheduler component 109 may initiate a transfer of processor states of a computer processing unit (a CPU, whether a hardware CPU or a virtualized CPU) to a different CPU (e.g., on a different computing device or in a different container or a different CPU on the same computing device) and/or sending data stored in memory to the target container 111*b* and then transmitting the process itself afterwards. In another embodiment, the scheduler component 109 may schedule the move of the process 105 without moving memory stored in data until after the process 105 is executed in the target container 111*b*.

The method 200 includes allocating, by a second hypervisor executing on the second machine, a third amount of the first virtual resource, the third amount substantially similar to the determined second amount (212).

The method 200 includes communicating, by the resource allocation process, to the containerized process, that the first amount of the first virtual resource is allocated to the containerized process (214). Due to the process 105 receiving information indicating that the amount of the virtual resource allocated to the process 105 remains the same, and due to the migration during execution of the process 105 between containers, the process 105 continues to execute seamlessly and to utilize the amount of the virtual resource needed without being aware of—or having execution impacted by—the changes made to the resource allocation or to the container in which the process 105 executes.

The agent 107 may continue monitoring the utilization of the first virtual resource by the containerized process during execution of the containerized process.

As will be understood by those of skill in the art, the methods described herein may execute in parallel over multiple processes and for multiple resources. For example, as described above, only a single virtual resource associated with a physical resource is allocated and optimized. However, a hypervisor may allocate multiple virtual resources to each of a plurality of processes and may allocate different amounts of different virtual resources to different processes; similarly, the agent may monitor utilization of multiple virtual resources by each of a plurality of processes and may determine alternate amounts for allocation based on utilization for different resources and/or for different processes.

Figure 2B:
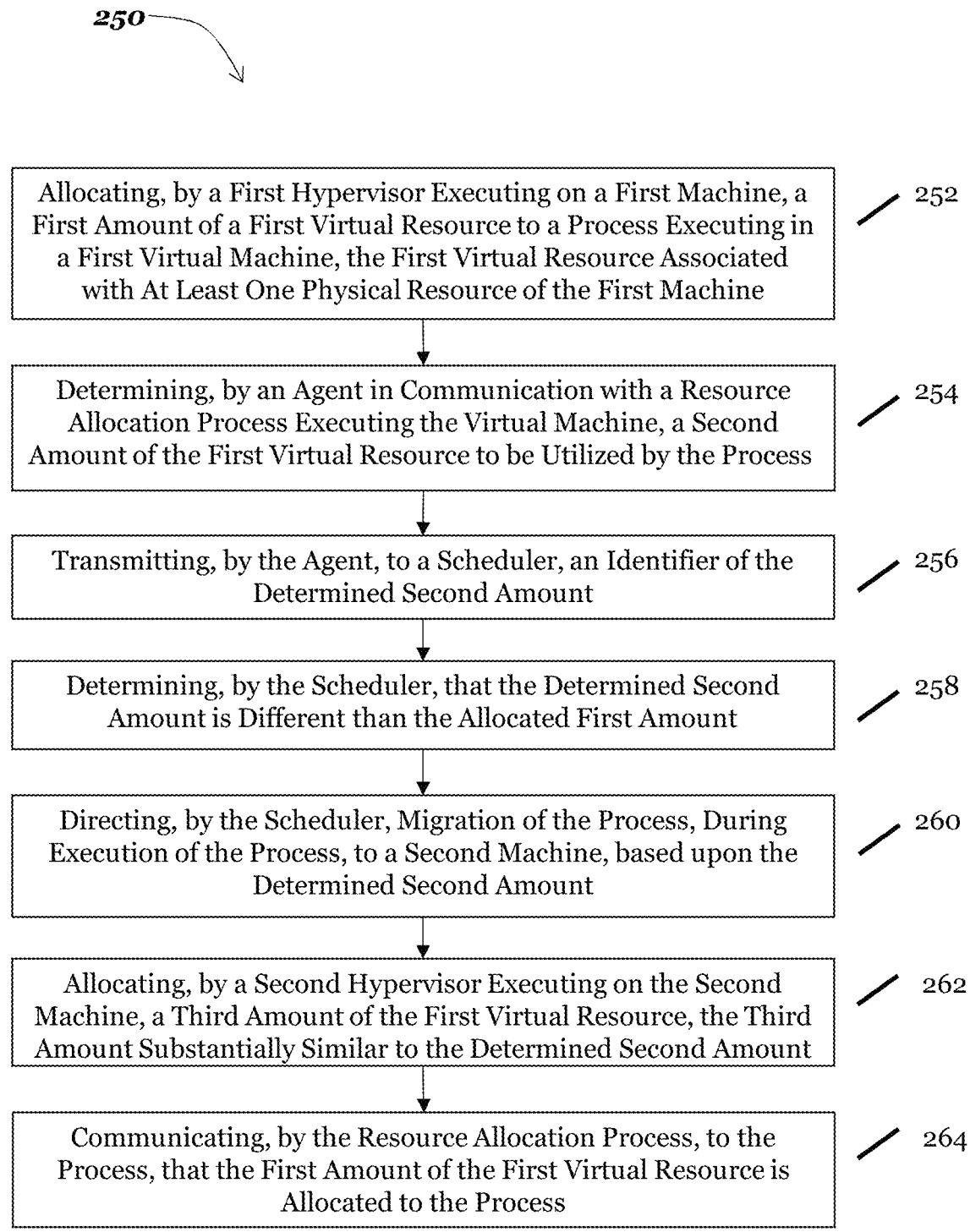
FIG. 2B is a flow diagram depicting an embodiment of a method for dynamically optimizing and modifying allocation of virtual resources to processes executing in virtual machines.

Referring now to FIG. 2B, in brief overview, a block diagram depicts one embodiment of a method 250 for dynamically optimizing and modifying allocation of virtual resources to processes. The method 200 includes allocating, by a first hypervisor executing on a first machine, a first amount of a first virtual resource to a process executing in a virtual machine, the first virtual resource associated with at least one physical resource of the first machine (202). The method 200 includes determining, by an agent executing in a user space of the virtual machine and in communication with a resource allocation process executing in the user space of the virtual machine, a second amount of the first virtual resource to be utilized by the process (204). The method 200 includes transmitting, by the agent to a scheduler, an identifier of the determined second amount (206).

The method 200 includes determining, by the scheduler, that the determined second amount is different than the allocated first amount. (208). The method 200 includes directing, by the scheduler, migration of the process, during execution of the process, to a second machine, based upon the determined second amount (210). The method 200 includes allocating, by a second hypervisor executing on the second machine, a third amount of the first virtual resource, the third amount substantially similar to the determined second amount (212). The method 200 includes communicating, by the second hypervisor, to the process, that the first amount of the first virtual resource is allocated to the process (214).

Referring now to FIG. 2B, in brief overview, a block diagram depicts one embodiment of a method 250 for dynamically optimizing and modifying allocation of virtual resources to processes. The method 200 includes allocating, by a first hypervisor executing on a first machine, a first amount of a first virtual resource to a process executing in a virtual machine, the first virtual resource associated with at least one physical resource of the first machine (252). The allocating may occur as described above in connection with FIG. 2A.

The method 250 includes determining, by an agent executing in a user space of the virtual machine and in communication with a resource allocation process executing in the user space of the virtual machine, a second amount of the first virtual resource to be utilized by the process (254). The determining by the agent may occur as described above in connection with FIG. 2A.

The method 250 includes transmitting, by the agent to a scheduler, an identifier of the determined second amount (256). The transmitting may occur as described above in connection with FIG. 2A.

The method 250 includes determining, by the scheduler, that the determined second amount is different than the allocated first amount (258). The determining by the scheduler may occur as described above in connection with FIG. 2A.

The method 250 includes directing, by the scheduler, migration of the process, during execution of the process, to a second machine, based upon the determined second amount (260). The directing may occur as described above in connection with FIG. 2A.

The method 250 includes allocating, by a second hypervisor executing on the second machine, a third amount of the first virtual resource, the third amount substantially similar to the determined second amount (262). The allocating may occur as described above in connection with FIG. 2A.

The method 250 includes communicating, by the second hypervisor, to the process, that the first amount of the first virtual resource is allocated to the process (264). The communicating may occur as described above in connection with FIG. 2A.

In summary, the system 100 may be configured to execute containers or virtual machines. A first hypervisor on a first machine allocates a first mount of a virtual resource associated with a physical resource of the first machine. The agent 107 determines an amount that a process executing within the container or virtual machine is likely to actually utilize (or is actually utilizing) and communicates this determination with a scheduler component 109. The scheduler component 109 may determine that the amount the process actually utilizes is different from what the first hypervisor allocated to the process (whether because the process utilizes more or less than the amount allocated) and may determine to migrate the process 105 while the process continues executing to a second machine where the amount allocated and the amount utilized are more similar (e.g., "right-sized"). The resource allocation process 115 receives an identification of how much of the resources has actually been allocated to the process and may provide data to the agent 107 for use in determining the amount utilized and to compare the amount utilized to the amount allocated but throughout execution of the method, the resource allocation process 115 continues to communicate to the executing process 105 that the executing process 105 is allocated the amount originally specified by the first hypervisor. In some embodiments of the methods and systems described herein, therefore, the process 105 need not execute as if the process 105 had been allocated an unnecessarily constrained amount of a resource (e.g., artificially constrained to a minimum amount to avoid wasting resources) while the system 100 executes in an improved manner since minimized allocation of resources minimize total migration time, minimize downtime, minimize network traffic, and provide more efficient bin-packing (e.g., allows for execution of more containerized processor on each machine in the system), resulting in an improvement to the technology available for executing and migrating processes.

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIGS. 2A-2B.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

Although terms such as "optimize" and "optimal" may be used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, Python, Rust, Go, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 3A:
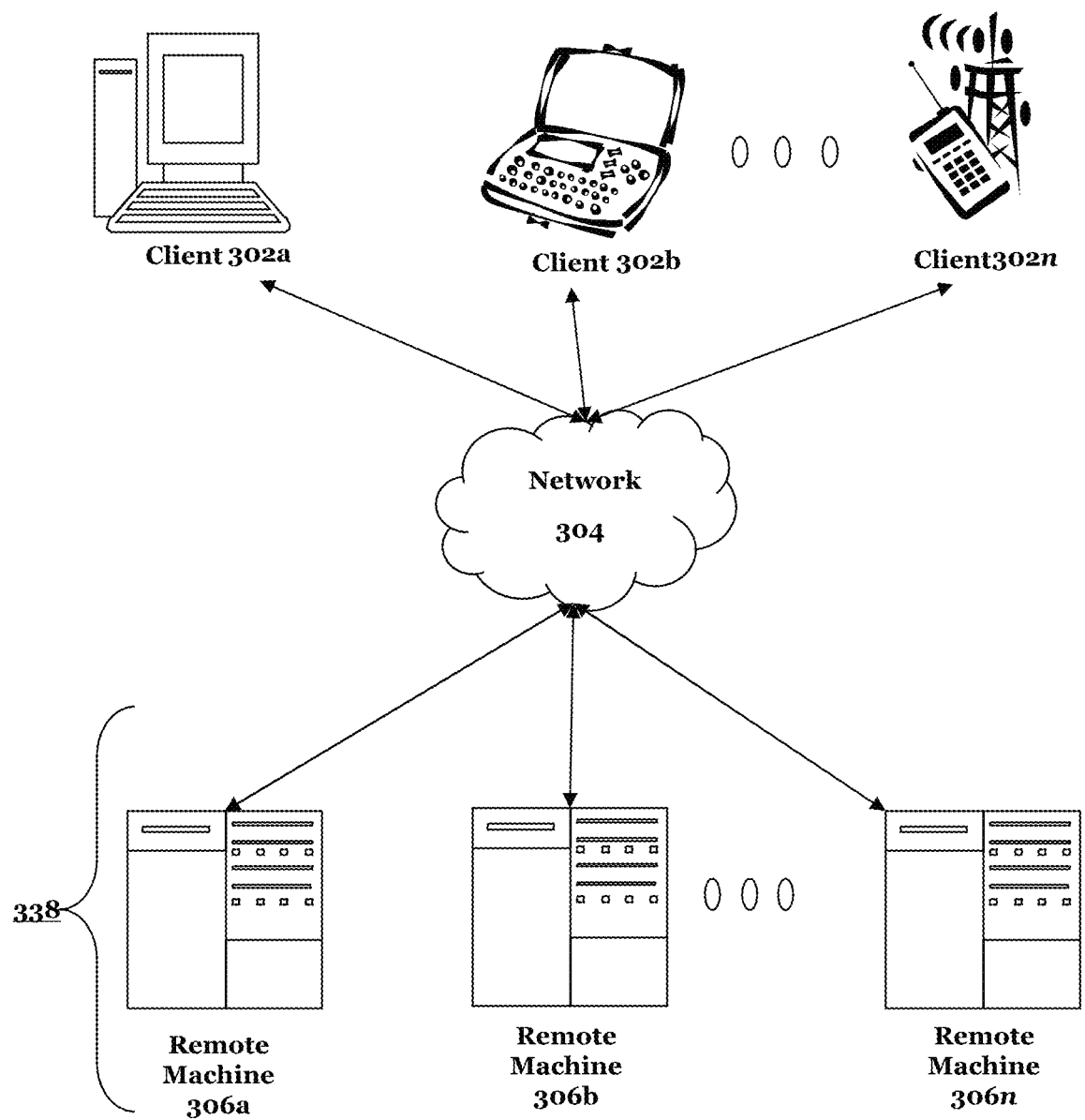
FIGS. 3A-3C are block diagrams depicting embodiments of computers useful in connection with the methods and systems described herein.
Figure 3B:
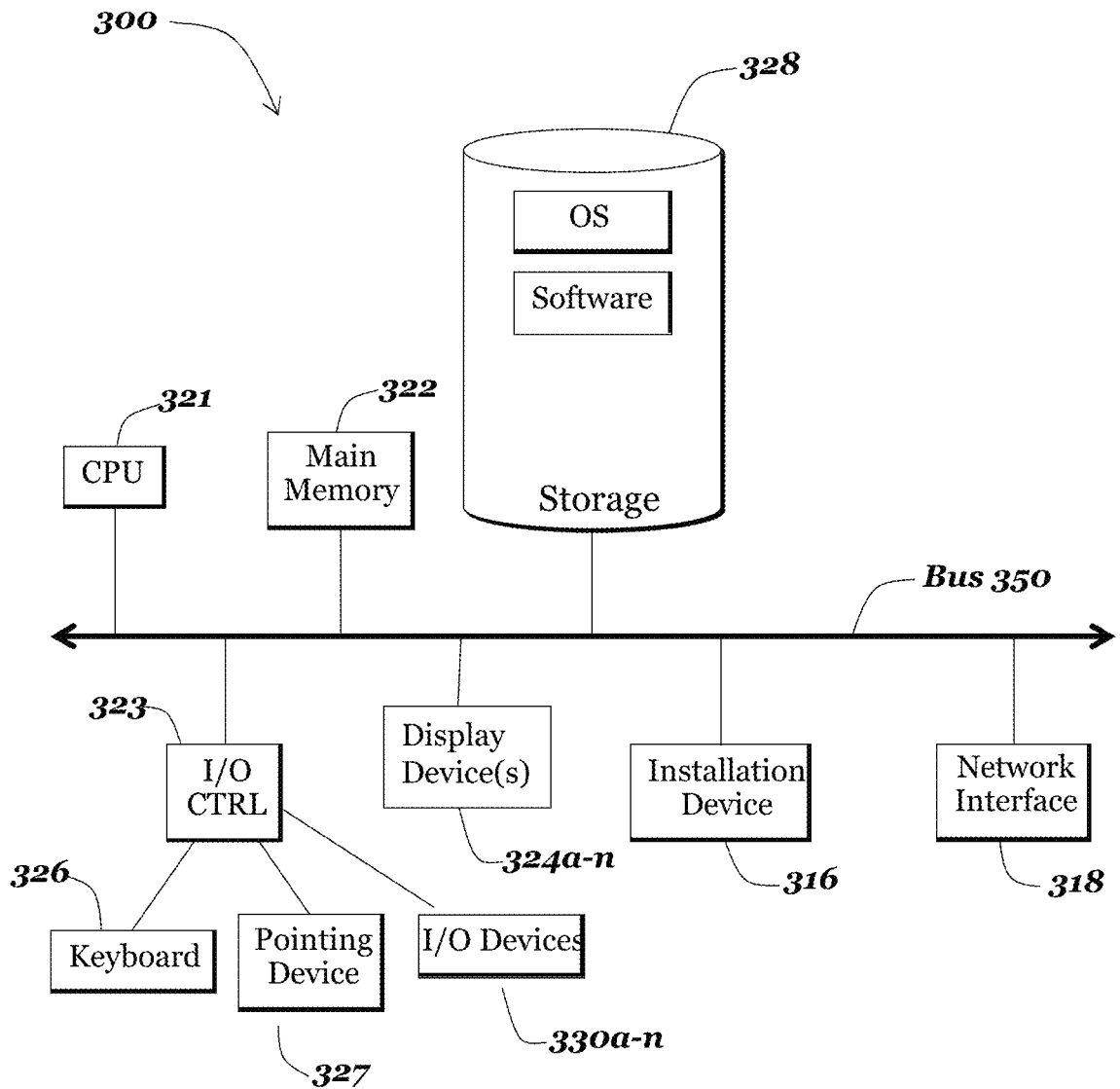
Figure 3C:
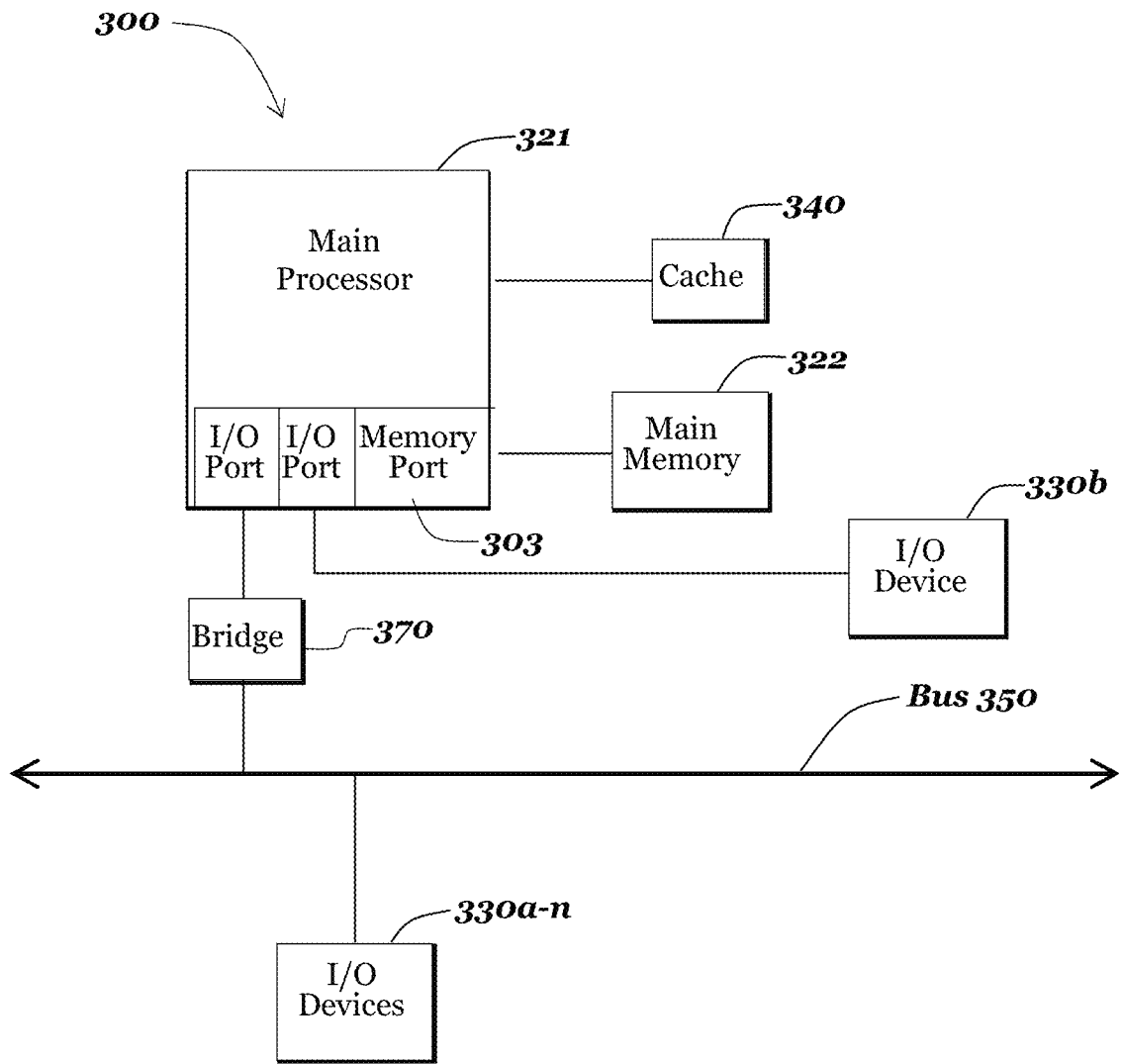

Referring now to FIGS. 3A, 3B, and 3C, block diagrams depict additional detail regarding computing devices that may be modified to execute novel, non-obvious functionality for implementing the methods and systems described above.

Referring now to FIG. 3A, an embodiment of a network environment is depicted. In brief overview, the network environment comprises one or more clients 302a-302n (also generally referred to as local machine(s) 302, client(s) 302, client node(s) 302, client machine(s) 302, client computer(s) 302, client device(s) 302, computing device(s) 302, endpoint(s) 302, or endpoint node(s) 302) in communication with one or more remote machines 306a-306n (also generally referred to as server(s) 306 or computing device(s) 306) via one or more networks 304.

Although FIG. 3A shows a network 304 between the clients 302 and the remote machines 306, the clients 302 and the remote machines 306 may be on the same network 304. The network 304 can be a local area network (LAN), such as a company Intranet, a metropolitan area network (MAN), or a wide area network (WAN), such as the Internet or the World Wide Web. In some embodiments, there are multiple networks 304 between the clients 302 and the remote machines 306. In one of these embodiments, a network 304' (not shown) may be a private network and a network 304 may be a public network. In another of these embodiments, a network 304 may be a private network and a network 304' a public network. In still another embodiment, networks 304 and 304' may both be private networks. In yet another embodiment, networks 304 and 304' may both be public networks.

The network 304 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, a wireline network, an Ethernet, a virtual private network (VPN), a software-defined network (SDN), a network within the cloud such as AWS VPC (Virtual Private Cloud) network or Azure Virtual Network (VNet), and a RDMA (Remote Direct Memory Access) network. In some embodiments, the network 304 may comprise a wireless link, such as an infrared channel or satellite band. The topology of the network 304 may be a bus, star, or ring network topology. The network 304 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 302 and a remote machine 306 (referred to generally as computing devices 300 or as machines 300) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 302 may execute, operate or otherwise provide an application, which can be any type and/or form of software, program, or executable instructions, including, without limitation, any type and/or form of web browser, web-based client, client-server application, an ActiveX control, a JAVA applet, a webserver, a database, an HPC (high performance computing) application, a data processing application, or any other type and/or form of executable instructions capable of executing on client 302.

In one embodiment, a computing device 306 provides functionality of a web server. The web server may be any type of web server, including web servers that are open-source web servers, web servers that execute proprietary software, and cloud-based web servers where a third party hosts the hardware executing the functionality of the web server. In some embodiments, a web server 306 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the ORACLE IPLANET web server products provided by Oracle Corporation of Redwood Shores, CA, or the ORACLE WEBLOGIC products provided by Oracle Corporation of Redwood Shores, CA.

In some embodiments, the system may include multiple, logically-grouped remote machines 306. In one of these embodiments, the logical group of remote machines may be referred to as a server farm 338. In another of these embodiments, the server farm 338 may be administered as a single entity.

As will be understood by those of skill in the art, in some embodiments, a computing device 300 may provide a virtualization environment. In such embodiments, the computing device 300 may include a hypervisor layer, a virtualization layer, and a hardware layer. The hypervisor layer includes a hypervisor that allocates and manages access to a number of physical resources in the hardware layer (e.g., the processor(s) and disk(s)) by at least one virtual machine executing in the virtualization layer. The virtualization layer includes at least one operating system and a plurality of virtual resources allocated to the at least one operating system. Virtual resources may include, without limitation, a plurality of virtual processors and virtual disks, as well as virtual resources such as virtual memory and virtual network interfaces. The plurality of virtual resources and the operating system may be referred to as a virtual machine. A hypervisor may provide virtual resources to an operating system in any manner that simulates the operating system having access to a physical device. A hypervisor may provide virtual resources to any number of guest operating systems. In some embodiments, a computing device executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, California; the XEN hypervisor, an open source product whose development is overseen by the open source Xen.org community; the KVM hypervisor, an open source product whose development is overseen by the open source Linux community; HyperV, VirtualServer or virtual PC hypervisors provided by Microsoft, Amazon Nitro, Amazon Firecracker, or others. In some embodiments, a computing device executing a hypervisor that creates a virtual machine platform on which guest operating systems may execute is referred to as a host server. In some embodiments, a hypervisor executes within an operating system executing on a computing device. In one of these embodiments, a computing device executing an operating system and a hypervisor may be said to have a host operating system (the operating system executing on the computing device), and a guest operating system (an operating system executing within a computing resource partition provided by the hypervisor). In other embodiments, a hypervisor interacts directly with hardware on a computing device, instead of executing on a host operating system. In one of these embodiments, the hypervisor may be said to be executing on "bare metal," referring to the hardware comprising the computing device. In some embodiments, the hypervisor controls processor scheduling and memory partitioning for a virtual machine executing on the computing device. In one of these embodiments, the hypervisor controls the execution of at least one virtual machine. In another of these embodiments, the hypervisor presents at least one virtual machine with an abstraction of at least one hardware resource provided by the computing device. In other embodiments, the hypervisor controls whether and how physical processor capabilities are presented to the virtual machine. In one embodiment, the guest operating system, in conjunction with the virtual machine on which it executes, forms a fully-virtualized virtual machine which is not aware that it is a virtual machine; such a machine may be referred to as a "Domain U HVM (Hardware Virtual Machine)". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor; in such an embodiment, the driver is typically aware that it executes within a virtualized environment. In another embodiment, the guest operating system, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include.

FIGS. 3B and 3C depict block diagrams of a computing device 400 useful for practicing an embodiment of the client 302 or a remote machine 306. As shown in FIGS. 3B and 3C, each computing device 300 includes a central processing unit 321, and a main memory unit 322. As shown in FIG. 3B, a computing device 300 may include a storage device 328, an installation device 316, a network interface 318, an I/O controller 323, display devices 324a-n, a keyboard 326, a pointing device 327, such as a mouse, and one or more other I/O devices 330a-n. The storage device 328 may include, without limitation, an operating system and software. As shown in FIG. 3C, each computing device 300 may also include additional optional elements, such as a memory port 303, a bridge 370, one or more input/output devices 330a-n (generally referred to using reference numeral 330), and a cache memory 340 in communication with the central processing unit 321.

The central processing unit 321 is any logic circuitry that responds to and processes instructions fetched from the main memory unit 322. In many embodiments, the central processing unit 321 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include RISC-V processors, SPARC processors, ARM processors, processors used to build UNIX/LINUX "white" boxes, and processors for mobile devices. The computing device 300 may be based on any of these processors, or any other processor capable of operating as described herein.

Main memory unit 322 may be one or more memory chips capable of storing data and allowing any storage location to be directly accessed by the central processing unit 321 (which may be a microprocessor). The main memory unit 322 may be based on any available memory chips capable of operating as described herein. In the embodiment shown in FIG. 3B, the central processing unit 321 communicates with main memory unit 322 via a system bus 350. FIG. 3C depicts an embodiment of a computing device 300 in which the central processing unit communicates directly with main memory unit 322 via a memory port 303. FIG. 3C also depicts an embodiment in which the central processing unit 321 communicates directly with cache memory 340 via a secondary bus, sometimes referred to as a backside bus. In other embodiments, the central processing unit 321 communicates with cache memory 340 using the system bus 350.

In the embodiment shown in FIG. 3B, the main processor 321 communicates with various I/O devices 330 via a system bus 350 (which may be referred to as a local bus). Various buses may be used to connect the central processing unit (the main processor 321) to any of the I/O devices 330, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display device 324a, the main processor 321 may use an Advanced Graphics Port (AGP) to communicate with the display device 324. FIG. 3C depicts an embodiment of a computing device 300 in which the main processor 321 also communicates directly with an I/O device 330b via, for example, HYPERTRANSPORT, RAPIDIO, or INFINIBAND communications technology.

One or more of a wide variety of I/O devices 330a-n may be present in or connected to the computing device 300, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 323 as shown in FIG. 3B. Furthermore, an I/O device may also provide storage and/or an installation device 316 (or installation medium) for the computing device 300. In some embodiments, the computing device 300 may provide USB connections (not shown) to receive handheld USB storage devices such as the USB Flash Drive line of devices manufactured by Twintech Industry, Inc. of Los Alamitos, CA.

Referring still to FIG. 3B, the computing device 400 may support any installation device 316, such as hardware for receiving and interacting with removable storage; e.g., disk drives of any type, CD drives of any type, DVD drives, tape drives of various formats, USB devices, external hard drives, or any other device suitable for installing software and programs. In some embodiments, the computing device 300 may provide functionality for installing software over a network 304. The computing device 300 may further comprise a storage device, such as one or more hard disk drives or redundant arrays of independent disks, for storing an operating system and other software. Alternatively, the computing device 300 may rely on memory chips for storage instead of hard disks.

Furthermore, the computing device 300 may include a network interface 318 to interface to the network 304 through a variety of connections including, but not limited to, standard telephone lines, LAN or WAN links (e.g., 802.11, T1, T3, 56 kb, X.25, SNA, DECNET, RDMA), broadband connections (e.g., ISDN, Frame Relay, ATM, Gigabit Ethernet, Ethernet-over-SONET), wireless connections, virtual private network (VPN) connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 300 communicates with other computing devices 300' via any type and/or form of gateway or tunneling protocol such as GRE, VXLAN, IPIP, SIT, ip6tnl, VTI and VTI6, IP6GRE, FOU, GUE, GENEVE, ERSPAN, Secure Socket Layer (SSL) or Transport Layer Security (TLS). The network interface 318 may comprise a built-in network adapter, network interface card, PCMCIA network card, card bus network adapter, wireless network adapter, USB network adapter, modem, or any other device suitable for interfacing the computing device 300 to any type of network capable of communication and performing the operations described herein.

In further embodiments, an I/O device 330 may be a bridge between the system bus 350 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a Serial Plus bus, a SCI/LAMP bus, a Fibre Channel bus, or a Serial Attached small computer system interface bus.

A computing device 300 of the sort depicted in FIGS. 3B and 3C typically operates under the control of operating systems, which control scheduling of tasks and access to system resources. The computing device 300 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 7, WINDOWS 8, WINDOWS VISTA, WINDOWS 10, and WINDOWS 11 all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; CentOS, a freely-available operating system distributed by the centos.org community; SUSE Linux, a freely-available operating system distributed by SUSE, or any type and/or form of a Unix operating system, among others.

Having described certain embodiments of methods and systems for dynamically optimizing and modifying allocation of virtual resources to a process executing in a virtual machine, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for dynamically optimizing and modifying allocation of virtual resources to containerized processes, the method comprising:

allocating, by a first hypervisor executing on a first machine, a first amount of a first virtual resource to a container image executing on the first machine and including a containerized process, the first virtual resource associated with at least one physical resource of the first machine;

determining, by an agent in communication with a resource allocation process executing in an instance of the container image, a second amount of the first virtual resource to be utilized by the containerized process;

transmitting, by the agent to a scheduler, an identifier of the determined second amount;

determining, by the scheduler, that the determined second amount is different than the allocated first amount;

directing, by the scheduler, migration of the containerized process, during execution of the containerized process, to a second machine based upon the determined second amount;

allocating, by a second hypervisor executing on the second machine, a third amount of the first virtual resource, wherein the third amount is the same as the determined second amount;

directing, by the scheduler, a pause in execution of a first subset of threads in a plurality of threads of the containerized process;

directing, by the scheduler, during continued execution of a second subset of threads in the plurality of threads of the containerized process, migration of the containerized process to the second machine;

directing, by the scheduler, continued execution of the first subset and the second subset of threads in the plurality of threads of the containerized process upon completion of the migration of the containerized process to the second machine; and communicating, by the resource allocation process, to the containerized process, that the first amount of the first virtual resource is allocated to the containerized process.

2. The method of claim 1, wherein determining the second amount further comprises determining by an agent executing in a user space of the instance of the container image.

3. The method of claim 1, wherein determining the second amount further comprises determining by an agent executing in a kernel space of the instance of the container image.

4. The method of claim 1, wherein determining the second amount further comprises receiving, by the agent, user input from a user of the containerized process providing data for use in determining the second amount.

5. The method of claim 1, wherein determining the second amount further comprises receiving, by the agent, from the containerized process, data for use in determining the second amount.

6. The method of claim 1 further comprising:
monitoring, by the agent in communication with the resource allocation process, utilization of the first virtual resource by the containerized process;
identifying, by the agent, a modification to a utilization rate by the containerized process of the first virtual resource;
communicating, by the agent, to the scheduler, the identified modification;
directing, by the scheduler, a pause in execution of a first subset of threads in a plurality of threads of the containerized process;
directing, by the scheduler, during continued execution of a second subset of threads in the plurality of threads of the containerized process, migration of the containerized process to a third machine; and
directing, by the scheduler, continued execution of the first subset and the second subset of threads in the plurality of threads of the containerized process upon completion of the migration of the containerized process to the third machine.

7. A method for dynamically optimizing and modifying allocation of virtual resources to a process executing in a virtual machine, the method comprising:
allocating, by a first hypervisor executing on a first machine, a first amount of a first virtual resource to a process executing in a virtual machine, the first virtual resource associated with at least one physical resource of the first machine;
determining, by an agent in communication with a resource allocation process executing in the virtual machine, a second amount of the first virtual resource to be utilized by the process;
transmitting, by the agent to a scheduler, an identifier of the determined second amount;
determining, by the scheduler, that the determined second amount is different than the allocated first amount;
directing, by the scheduler, migration of the process to a second machine based upon the determined second amount;
allocating, by a second hypervisor executing on the second machine, a third amount of the first virtual resource, wherein the third amount is the same as the second amount;
directing, by the scheduler, a pause in execution of a first subset of threads in a plurality of threads of the containerized process;
directing, by the scheduler, during continued execution of a second subset of threads in the plurality of threads of the containerized process, migration of the containerized process to the second machine;
directing, by the scheduler, continued execution of the first subset and the second subset of threads in the plurality of threads of the containerized process upon completion of the migration of the containerized process to the second machine; and
communicating, by the resource allocation process, to the process, that the first amount of the first virtual resource is allocated to the process.

8. The method of claim 7, wherein determining the second amount further comprises determining by an agent executing in a user space of the virtual machine.

9. The method of claim 7, wherein determining the second amount further comprises determining by an agent executing in a kernel space of the virtual machine.

10. The method of claim 7, wherein determining the second amount further comprises receiving, by the agent, user input from a user of the process providing data for use in determining the second amount.

11. The method of claim 7, wherein determining the second amount further comprises receiving, by the agent, from the process, data for use in determining the second amount.

12. The method of claim 7 further comprising:
monitoring, by the agent in communication with the resource allocation process, utilization of the first virtual resource by the process;
identifying, by the agent, a modification to a utilization rate by the process of the first virtual resource;
communicating, by the agent, to the scheduler, the identified modification;
directing, by the scheduler, a pause in execution of a first subset of threads in a plurality of threads of the process;
directing, by the scheduler, during continued execution of a second subset of threads in the plurality of threads of the process, migration of the process to a third machine; and
directing, by the scheduler continued execution of the first subset and the second subset of threads in the plurality of threads of the process upon completion of the migration of the process to the third machine.

13. A system for dynamically optimizing and modifying allocation of virtual resources to containerized processes comprising:
first hypervisor executing on a first machine allocating a first amount of a first virtual resource to a container image executing on the first machine and including a process, the first virtual resource associated with at least one physical resource of the first machine;
an agent determining a second amount of the first virtual resource to be utilized by the process;
a scheduler receiving, from the agent, an identifier of the determined second amount, determining that the determined second amount is different than the allocated first amount, directing migration of the process, during execution of the process, to a second machine based upon the determined second amount, wherein directing further comprises:
directing a pause in execution of a first subset of threads in a plurality of threads of the containerized process,
directing during continued execution of a second subset of threads in the plurality of threads of the containerized process, migration of the containerized process to the second machine, and
directing continued execution of the first subset and the second subset of threads in the plurality of threads of the containerized process upon completion of the migration of the containerized process to the second machine;
a second hypervisor executing on the second machine allocating a third amount of the first virtual resource, wherein the third amount is the same as the determined second amount; and
a resource allocation process, executing in the second virtual machine and in communication with the agent, communicating, to the process on the second machine, that the first amount of the first virtual resource is allocated to the process.

14. The system of claim 13, wherein the agent further comprises an agent executing in the first machine.

15. The system of claim 13, wherein the scheduler executes on a third machine.

16. The system of claim 13, wherein the agent and the scheduler execute on a third machine.

17. The system of claim 13, wherein the resource allocation process is a kernel of the second machine.

18. The system of claim 13, wherein the resource allocation process is a driver executed by a kernel of the second machine.

* * * * *